United States Patent [19]

Sterling

[11] 4,429,092
[45] Jan. 31, 1984

[54] ROOM TEMPERATURE POLYMERIZATION OF ACRYLATE MONOMERS WITH PEROXYESTERS

[75] Inventor: Gary P. Sterling, San Rafael, Calif.

[73] Assignee: U.S. Peroxygen Company, Richmond, Calif.

[21] Appl. No.: 446,904

[22] Filed: Dec. 6, 1982

[51] Int. Cl.$^3$ ............................. C08F 4/10; C08F 4/16
[52] U.S. Cl. .................................... 526/192; 526/328; 526/221
[58] Field of Search ................ 526/227, 221, 328, 192

[56] References Cited

U.S. PATENT DOCUMENTS

| | | | |
|---|---|---|---|
| 4,230,811 | 10/1980 | Ilnyckyj | 526/227 |
| 4,239,875 | 12/1980 | Voronkova et al. | 526/227 |
| 4,389,514 | 6/1983 | Schmidle | 526/192 |

*Primary Examiner*—Joseph L. Schofer
*Assistant Examiner*—Peter F. Kulkosky
*Attorney, Agent, or Firm*—Townsend and Townsend

[57] ABSTRACT

A composition for preparing polymeric articles comprising: (a) an acrylic polymerizable component such as monomeric and polymeric aliphatic acrylate and methacrylate esters having a Brookfield viscosity of about 0.1–400 poise and about 5–60% by weight of solids; (b) copper and tin polymerization promoters providing in the composition about 0.05–4 ppm of $Cu^{+2}$ and about 10–300 ppm of $Sn^{+2}$; (c) about $5 \times 10^{-6}$ to $1 \times 10^{-4}$ mole/gm of the composition of a primary mercaptan chain transfer agent; and (d) sufficient peroxyester initiator to provide about 0.02–0.3% by weight of active oxygen in the composition. The composition is highly efficient at room temperature and provides excellent optical quality polymers while permitting a wide choice of peroxyesters as the initiator.

20 Claims, No Drawings

ROOM TEMPERATURE POLYMERIZATION OF ACRYLATE MONOMERS WITH PEROXYESTERS

BACKGROUND OF THE INVENTION

1. Field of the Invention

This invention relates to the polymerization and curing of acrylic monomers and polymers. More particularly, it relates to the rapid production of acrylic polymers, usually from an acrylic containing syrup, with peroxyester initiators in the presence of a limited group of promoters and chain transfer agents.

2. Description of the Prior Art

U.S. Pat. No. 4,188,315 to Dudinyak is directed to the polymerization of acrylate syrups utilizing formulations which are suitable for room temperature applications, but where good optical properties are not required in the resulting acrylic polymers. Rapid room temperature cures are obtained with the use of metal salts of hemiperesters of maleic acid as the polymerization initiator in the presence of a salt of an oxo acid of sulfur activator.

The article by V. R. Kamath, et al., "Novel Room Temperature Cure System", presented at the 37th Annual Conference, Reinforced Plastics/Composites Institute, The Society of the Plastics Industry, Inc. Session 12-B (Jan. 11-15, 1982), describes a peroxyester initiated room temperature formulation for polyester resins. The system described is not suitable for acrylic systems.

U.S. Pat. No. 3,487,062 to Bodycot describes a system for acrylic polymerization useful at room temperature and providing good optical properties in the acrylic end product. The peroxyester initiator is limited to t-butyl peroxy maleate in combination with stannous chloride, tertiary amine hydrochloride and a mercaptan which are also used in the system.

U.S. Pat. No. 4,189,451 to Dudinyak provides an acrylic polymer at room temperature with a system similar to that of Dudinyak '315.

U.S. Pat. No. 3,775,364 to Duggins describes the polymerization of an acrylic system again utilizing a mercaptan chain transfer agent and a metal salt of a hemiperester such as monotertiary butyl peroxy maleate as a polymerization initiator.

SUMMARY OF THE INVENTION

The present invention describes a composition for preparing polymeric articles suitable for use under ambient conditions if desired and which includes four essential components: (a) a polymerizable component selected from monomeric and polymeric aliphatic acrylics having a Brookfield viscosity of about 0.1-400 poise and about 5-60% by weight of solids; (b) copper and tin polymerization promoters providing in the composition about 0.05-4 ppm of $Cu^{+2}$ and about 10-300 ppm of $Sn^{+2}$; (c) about $5 \times 10^{-6}$ to $1 \times 10^{-4}$ mole/gm of the composition of a primary mercaptan chain transfer agent; and (d) sufficient peroxyester initiator to provide about 0.02-0.3% by weight of active oxygen in the composition.

Where the composition contains all of the above components and the formulation is mixed and cured, an acrylic polymer product of excellent optical quality is obtained at room temperature. The formulation is very efficient in that peak temperatures are reached in a brief period of time, for example on the order of thirty minutes. Exotherms are sufficiently high in the system, resulting in low monomer residue.

A major advantage of the new composition and method is the wide choice of peroxyester initiators permitted. For example, the present compositions may utilize t-buty peroxy benzoate, which has significant advantages from the standpoint of cost as well as stability and relative ease of storage and handling. Also, most of these peroxyesters are available commercially as pure products.

DESCRIPTION OF THE INVENTION

The invention is broadly applicable to the formation of acrylic resins from acrylic monomers and polymers in all of their known variations. Thus, the invention is applicable to monomeric and polymeric aliphatic acrylate and methacrylate esters, both linear and cyclic. The acrylic monomers also include cyanoacrylates as well as the acrylic acids from which the esters are formed.

Usually the starting material to be polymerized will be provided in the form of a "syrup" as that term is understood in this art. A syrup is formed from an acrylic polymer in a liquid acrylic monomer. In general, some polymer content is desired in the syrup so that heat will be retained during the course of the polymerization reaction and thereby accelerate the curing time. The higher viscosity syrups, therefore, provide a more efficient system. The present invention does, however, contemplate the polymerization of acrylic monomers when the monomer is coreacted with ethylene glycol dimethacrylate without the presence of any polymer.

The compositions and methods of this invention are useful for coreacting a curable resin other than an acrylate with the acrylates. Any suitable curable coreactant may be used. In the preferred embodiment, a polyester containing coreactive ethylenic unsaturation is contemplated for coreaction with the selected acrylates.

As indicated, the present invention is advantageous in that it permits employing any one of a broad range of polyester initiators. In the preferred embodiment, the peroxyester is selected from:

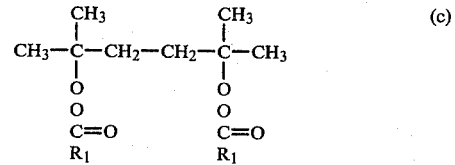

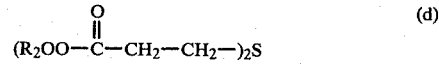

where $R_1$ contains up to 13 carbon atoms and is phenyl, alkyl, alkenyl or carboxylic substituted cycloalkyl;

$R_2$ is t-alkyl of 4-8 carbon atoms; and $R_3$ contains up to 13 carbon atoms and is alkyl, alkenyl or carboxylic substituted cycloalkyl. The alkyl and alkenyl groups may be straight or branched chain.

The amounts of the composition to be polymerized are important. The following table summarizes the useful amounts of each component:

| Ingredient | Useful Range | Optimum Level |
|---|---|---|
| MMA* Syrup | 0.1–400 poise | >10 poise |
|  | 5–60% solids | >10% solids |
| $Cu^{+2}$ | 0.05–4 ppm | 1–2 ppm |
| $Sn^{+2}$ | 10–300 ppm | 100–200 ppm |
| mercaptan | $5 \times 10^{-6} - 1 \times 10^{-4}$ mole/gm | $2.5 \times 10^{-5} - 5 \times 10^{-5}$ mole/gm |
| peroxyester | 0.02–0.3 A.O.** | >0.07 A.O. |

*MMA = methyl methacrylate
**A.O. = active oxygen

With respect to the mercaptan used in the present invention, the only requirement is that it be a primary mercaptan. Particularly satisfactory results have been obtained with laurylmercaptan but any of the other mercaptans described in prior literature could also be utilized. The following work will illustrate the invention.

EXPERIMENTAL

Polymerization Runs

All runs were made in 30 ml glass vials (3×6.3 cm) with polyethylene snap caps, and monitored with a type J thermocouple on line to a Rustrak (model 2155A) X-Y potentiometer. A sample size of 10 gms (syrup) was used for all samples and the ingredients were mixed in the vials with a stainless steel spatula.

Promoter Formulations

The 0.005% $Cu^{+2}$ and 0.53% $Sn^{+2}$ solution was made as follows:

0.75 gms aliquot of 33% $SnCl_2.2H_2O$ in methanol was added to 24 gms of MMA along with 0.014 gms (1 drop) of copper naphthenate (8%). This mixture was then mixed and stored in an amber bottle. The 0.009% $Cu^{+2}$ and 1.05% $Sn^{+2}$ solution was made up as described above except 0.03 gms (2 drops) of 8% copper naphthenate and 1.5 gms of 33% $SnCl_2.2H_2O$ were added to 24 gms of MMA. The other metal solutions were made up in MMA except the iron solutions, which were made up in methanol/MMA (1/5).

Acrylic Syrup

A 3 kg bottle of MMA (Baker) that was autolytically polymerized to 11.5% solids and 50 poise was used for most runs. Other syrups were made from a 40% solids (Elvacite ® acrylic resin) in MMA (Baker). All viscosities of resins were determined on a Brookfield Synchro-Lectric viscometer (model HAF).

TABLE 1

Peroxides Used in Room Temperature Experiments

| Peroxides | Abbreviation | % Purity | MW |
|---|---|---|---|
| 1. di-2-ethylhexyl peroxydicarbonate | 2EHP | 96.0 | 346.3 |
| 2. t-butyl perneodecanoate | TBPN | 75.9 | 244.4 |
| 3. t-butylperpivalate | TBPP | 77.0 | 174.2 |
| 4. diacetyl peroxide | — | 18.0 | 118.1 |
| 5. benzoyl peroxide | BPO | 98.0 | 242.2 |
| 6. t-butylperoxy 2-ethyl hexanoate | TBPEH | 96.4 | 216.3 |
| 7. t-butylperoxy 2-ethyl hexyl carbonate | TBPEHC | 78.5 | 246.2 |
| 8. methylethyl ketone peroxide | MEKP | 9.0% A.O. |  |
| 9. cumene hydroperoxide | CHP | 85.0 | 146.1 |
| 10. 1,1-bis(t-butylperoxy) cyclohexane | 11TBPH | 98.0 | 260.4 |
| 11. 2,5-dimethyl-2,5-bis(t-butyl peroxy) hexane | 25TBH | 98.0 | 290.4 |
| 12. t-butyl peroxybenzoate | TBPB | 98.0 | 194.2 |
| 13. 2,5-dimethyl-2,5-bis(2-ethyl hexanoyl peroxy)hexane | 25TBPEHH | 92.0 | 430.6 |
| 14. 2,5-dimethyl-2,5-bis(benzoyl peroxy)hexane | 25TBPBH | 78.8 | 386.4 |
| 15. t-butylperoxy crotonate | TBPC | 62.3 | 158.2 |
| 16. bis-(t-butylperoxy) thiodipropionate | TBPTP | 97.0 | 322.3 |
| 17. t-amyl peroxy 2-ethylhexanoate | TAPEH | 76.4 | 230.3 |
| 18. t-butyl peroxytetrahydro phthalic acid | TBPTA | 91.3 | 242.3 |

TABLE 2

Peroxides as Room Temperature Initiators

| Formulation, parts by weight | | | | |
|---|---|---|---|---|
| MMA syrup (11.5% solids, 50 poise) | | | 100 | |
| 0.005% $Cu^{+2}$ (from 8% Cu.Naphthenate in MMA) | | | 2 | |
| 0.53% $Sn^{+2}$ (1% $SnCl_2.2H_2O$ in MMA) | | | 2 | |
| Laurylmercaptan | | | 1 | |
| Peroxide (used at purity of Table 1) | | | 2 | |

| Peroxide | % A.O. | Type | Time (hrs) to Peak Exotherm | Peak Exotherm Temp. (°C.) |
|---|---|---|---|---|
| 1. diacetyl peroxide | .048 | diacyl peroxide | gelled overnight | |
| 2. benzoyl peroxide | .132 | aromatic diacyl peroxide | gelled overnight | |
| 3. methylethyl ketone peroxide | .180 | MEK peroxide | gelled w/in 48 hrs. | |
| 4. cumene hydroperoxide | .186 | hydroperoxide | gelled overnight | |
| 5. 1,1-bis(t-butyl peroxy) cyclohexane | .241 | peroxyketal | gelled w/in 48 hrs. | |
| 6. 2,5-dimethyl-2,5-bis (t-butylperoxy)hexane | .216 | dialkyl peroxide | gelled w/in 48 hrs. | |
| 7. di-2-ethylhexyl peroxydicarbonate | .042 | peroxy dicarbonate | gelled overnight | |
| 8. t-butylperoxy 2-ethyl hexyl carbonate | .130 | percarbonic ester | 0.60 | 110 |
| 9. t-butylperoxy 2-ethyl hexanoate | .148 | peroxy ester | 0.60 | 120 |
| 10. t-butylperoxy benzoate | .161 | peroxy ester | 0.40 | 110 |
| 11. t-butylperoxy neodecanoate | .099 | peroxy ester | 0.60 | 102 |

TABLE 2-continued

Peroxides as Room Temperature Initiators

Formulation, parts by weight

| | |
|---|---|
| MMA syrup (11.5% solids, 50 poise) | 100 |
| 0.005% Cu$^{+2}$ (from 8% Cu.Naphthenate in MMA) | 2 |
| 0.53% Sn$^{+2}$ (1% SnCl$_2$.2H$_2$O in MMA) | 2 |
| Laurylmercaptan | 1 |
| Peroxide (used at purity of Table 1) | 2 |

| | Peroxide | % A.O. | Type | Time (hrs) to Peak Exotherm | Peak Exotherm Temp. (°C.) |
|---|---|---|---|---|---|
| 12. | t-butylperoxy pivalate | .142 | peroxy ester | 0.35 | 120 |
| 13. | 2,5-dimethyl-2,5-bis (2-ethylhexanoyl peroxy)hexane | .133 | diperoxyester | 0.50 | 105 |
| 14. | 2,5-dimethyl-2,5-bis (benzoyl peroxy)hexane | .127 | diperoxyester | 0.50 | 105 |
| 15. | t-butylperoxy crotonate | .126 | peroxyester | 0.50 | 130 |
| 16. | bis-(t-butylperoxy) thiodipropionate* | .194 | diperoxyester | 2.25 | 50 |
| 17. | t-amyl peroxy 2-ethylhexanoate | .106 | peroxyester | 0.30 | 130 |
| 18. | t-butyl peroxytetrahydrophthalic acid | .121 | peroxyester acid | 0.70 | 80 |

*This system appears to require laurylmercaptan.

TABLE 3

Effect of Peroxyester Concentration on Cure Rate

Formulation, parts by weight

| | |
|---|---|
| MMA syrup (11.5% solids, 50 poise) | 100 |
| 0.009% Cu$^{+2}$ (from 8% Cu.Naphthenate in MMA) | 1 |
| 1.05% Sn$^{+2}$ (2% SnCl$_2$.2H$_2$O in MMA) | 1 |
| Laurylmercaptan | 1 |

| | Peroxide | Parts by wt. | % A.O. | Time (hrs) to Peak Exotherm | Peak Exotherm Temp. (°C.) |
|---|---|---|---|---|---|
| 1.a. | t-butyl peroxybenzoate | 0 | 0 | none | none |
| b. | t-butylperoxy 2-ethyl-hexanoate | 0 | 0 | none | none |
| 2.a. | t-butyl peroxybenzoate | 0.5 | .040 | 2.5 | 65 |
| b. | t-butylperoxy 2-ethyl-hexanoate | 0.5 | .036 | 3.6 | 50 |
| 3.a. | t-butyl peroxybenzoate | 1.0 | .081 | 1.0 | 100 |
| b. | t-butylperoxy 2-ethyl-hexanoate | 1.0 | .071 | 1.0 | 105 |
| 4.a. | t-butyl peroxybenzoate | 2.0 | .161 | 0.6 | 120 |
| b. | t-butylperoxy 2-ethyl-hexanoate | 2.0 | .143 | 0.4 | 110 |
| 5.a. | t-butyl peroxybenzoate | 3.0 | .242 | .7 | 90 |
| b. | t-butylperoxy 2-ethyl-hexanoate | 3.0 | .214 | .7 | 110 |

TABLE 4

Metal Ions as Promoters

Formulation, parts by weight

| | |
|---|---|
| MMA syrup (11.5% solids, 50 poise) | 100 |
| 1.0% SnCl$_2$.2H$_2$O in MMA (0.53% Sn$^{+2}$) | 1 |
| Laurylmercaptan | 0.5 |
| ethylene glycol dimethacrylate | 1 |
| t-butyl peroxybenzoate | 2 |

| % Metal Ion | Type | Parts by wt. | Metal Ion, Approx. ppm | Time (hrs) to Peak Exotherm | Peak Exotherm Temp. (°C.) |
|---|---|---|---|---|---|
| 0.005% Cu$^{+2}$ | 8% Cu Naphthenate | 0 | | none | none |
| 0.005% Cu$^{+2}$ | 8% Cu Naphthenate | 0.1 | 0.05 | 4.3 | 40 |
| 0.005% Cu$^{+2}$ | 8% Cu Naphthenate | 0.5 | 0.25 | 2.5 | 53 |
| 0.005% Cu$^{+2}$ | 8% Cu Naphthenate | 1.0 | 0.5 | 2.8 | 58 |
| 0.005% Cu$^{+2}$ | 8% Cu Naphthenate | 2.0 | 1 | 1.6 | 98 |
| 0.005% Cu$^{+2}$ | 8% Cu Naphthenate | 3.0 | 1.5 | 1.8 | 98 |
| 0.005% Cu$^{+2}$ | 8% Cu Naphthenate | 4.0 | 2.0 | 1.7 | 110 |
| 0.005% Cu$^{+2}$ | Cu(acac)* | 1.0 | 0.5 | 2.5 | 65 |
| 0.005% Co$^{+2}$ | Co(acac) | 1.0 | 0.5 | none | none |
| 0.006% Mn$^{+2}$ | Mn(acac) | 1.0 | 0.6 | none | none |
| 0.003% V$^{+2}$ | V(acac) | 1.0 | 0.3 | none | none |
| 0.005% Ce$^{+3}$ | Ce(acac) | 1.0 | 0.5 | none | none |
| 0.005% Fe$^{+3}$ | Fe Cl$_3$.6H$_2$O | 1.0 | 0.5 | gelled overnight | |
| 0.005% Fe$^{+3}$ | Fe Cl$_3$ | 2.0 | 1 | gelled overnight | |
| 0.005% Fe$^{+2}$ | Fe Cl$_2$.4H$_2$O | 2.0 | 1 | gelled | |

TABLE 4-continued

Metal Ions as Promoters

Formulation, parts by weight

| | |
|---|---|
| MMA syrup (11.5% solids, 50 poise) | 100 |
| 1.0% SnCl$_2$.2H$_2$O in MMA (0.53% Sn$^{+2}$) | 1 |
| Laurylmercaptan | 0.5 |
| ethylene glycol dimethacrylate | 1 |
| t-butyl peroxybenzoate | 2 |

| % Metal Ion | Type | Parts by wt. | Metal Ion, Approx. ppm | Time (hrs) to Peak Exotherm | Peak Exotherm Temp. (°C.) |
|---|---|---|---|---|---|
| | | | | overnight | |

*acac = acetylacetonate

TABLE 5

Sn$^{+2}$ as a Promoter

Formulation, parts by weight

| | |
|---|---|
| MMA Syrup (11.5% solids, 50 poise) | 100 |
| 0.005% Cu$^{+2}$ (from 8% Cu.Naphthenate in MMA) | 1 |
| Laurylmercaptan | 1 |
| ethylene glycol dimethacrylate | 1 |
| t-butyl peroxybenzoate | 2 |
| 1% SnCl$_2$.2H$_2$O in MMA (0.53% Sn$^{+2}$) | |

| | Parts by Weight 0.53% Sn$^{+2}$ | Conc. Sn$^{+2}$ Approx. ppm | Time (hrs) to Peak Exotherm | Peak Exotherm Temperature (°C.) |
|---|---|---|---|---|
| 1. | 0 | 0 | none | none |
| 2. | 0.5 | 25 | 3.0 | 35 |
| 3. | 1.0 | 50 | 2.2 | 70 |
| 4. | 2.0 | 100 | 1.0 | 95 |
| 5. | 3.0 | 150 | .8 | 95 |
| 6. | 4.0 | 200 | .9 | 70 |
| 7. | 6.0 | 300 | .9 | 60 |

TABLE 6

Mercaptan as Promoter/Chain Transfer Agent

Formulation, parts by weight

| | |
|---|---|
| MMA syrup (11.5% solids, 50 poise) | 100 |
| 0.005% Cu$^{+2}$ (from 8% Cu.Naphthenate in MMA) | 1 |
| 1.0% SnCl$_2$.2H$_2$O in MMA (0.53% Sn$^{+2}$) | 1 |
| t-butyl peroxybenzoate | 2 |
| ethylene glycol dimethacrylate | 1 |

| Mercaptan | Parts by wt. | Time (hrs.) to Exotherm | Peak Exotherm Temp. (°C.) |
|---|---|---|---|
| Laurylmercaptan | 0 | none | none |
| Laurylmercaptan | 0.1 | 2.4 | 50 |
| Laurylmercaptan | 0.5 | 2.8 | 58 |
| Laurylmercaptan | 1.0 | 2.2 | 70 |
| Laurylmercaptan | 2.0 | 2.0 | 50 |
| Lauryl-3-mercapto propionate | 0.5 | 2.0 | 70 |
| 2-mercapto ethanol | 0.5 | 2.5 | 55 |
| 2-mercapto benzothiozole | 0.6 | none | none |

TABLE 7

Effect of Syrup Viscosity and % Solids on the Cure Rate

Formulation, parts by weight

| | |
|---|---|
| MMA syrup | 100 |
| 0.009% Cu$^{+2}$ (from 8% Cu.Naphthenate in MMA) | 1 |
| 1.05% Sn$^{+2}$ (2% SnCl$_2$.2H$_2$O in MMA) | 1 |
| Laurylmercaptan | 1 |

| | Syrup % Solids | Viscosity | Time (hrs.) Peak Exotherm | Peak Exotherm Temperature (°C.) |
|---|---|---|---|---|
| 1. | 40* | 300 poise | 0.3 | 100 |
| 2. | 30* | 9.2 poise | 0.5 | 100 |
| 3. | 20* | 0.13 poise | 1.8 | 70 |
| 4. | 11.5 | 50 poise | 0.6 | 120 |

*DuPont, Elvacite ® acrylic resin (grade 2010)

TABLE 8

Effect of Different Monomers on the Cure Rate

Formulation, parts by weight

| | |
|---|---|
| Monomer or syrup | 100 |
| 0.009% Cu$^{+2}$ (from 8% Cu.Naphthanate in MMA) | 1 |
| 1.05% Sn$^{+2}$ (2% SnCl$_2$.2H$_2$O in MMA) | 1 |
| Laurylmercaptan | 1 |
| t-butyl peroxybenzoate | 2 |

| Monomer | % Solids as PMMA* | Time (hrs) to Peak Exotherm | Peak Exotherm Temp. (°C.) |
|---|---|---|---|
| 1. ethylacrylate | 30 | 0.06 | 200 |
| 2. ethylacrylate | 0 | 0.10 | 200 |
| 3. ethylene glycol dimethacrylate | 0 | 0.05 | 200 |
| 4. allyl diglycol carbonate | 0 | no rxn. | — |
| 5. allyl diglycol carbonate/ ethylene glycol dimethacrylate (50:50) | 0 | 0.06 | 200 |
| 6. allyl diglycol carbonate/ ethylene glycol dimethacrylate (90:10) | 0 | 0.3** | 38 |
| 7. styrene | 0 | no rxn. | — |
| 8. MMA/ethylene glycol dimethacrylate (90:10) | 0 | 1.25 | 130 |
| 9. styrene/ethylene glycol dimethacrylate (80:20) | 0 | no rxn. | — |
| 10. methacrylic acid | 0 | 0.05 | 200 |
| 11. general purpose orthophthalic unsaturated polyester resin/ ethylene glycol dimethacrylate (85:15) | NA | 0.08 | 150 |
| 12. acrylonitrile | 0 | 0.08 | 120 |
| 13. MMA/acrylonitrile (75/25) | 12 | 0.10 | 100 |

*DuPont, Elvacite ® acrylic resin (grade 2010)
**Resulted in a hazy gell which became clear after post curing.

I claim:

1. A composition useful for preparing polymeric articles at ambient temperature and pressure comprising:
    (a) a polymerizable component selected from monomeric and polymeric aliphatic acrylics substantially free of ethylene monomer having a Brookfield viscosity of about 0.1–400 poise and about 5–60% by weight of solids;
    (b) copper and tin polymerization promoters providing in the composition about 0.05–4 ppm of Cu$^{+2}$ and about 10–330 ppm of Sn$^{+2}$;
    (c) about $5 \times 10^{-6}$ to $1 \times 10^{-4}$ mole/gm of the composition of a primary mercaptan chain transfer agent; and
    (d) sufficient peroxyester initiator to provide about 0.02–0.3% by weight of active oxygen in the composition.

2. A composition in accordance with claim 1 wherein said peroxyester initiator is selected from the formulas:

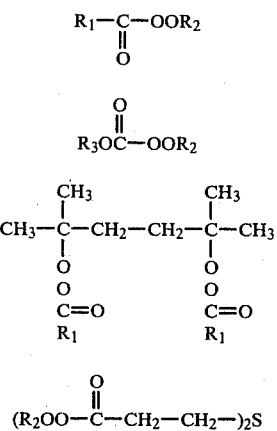

(a) $R_1-\underset{\underset{O}{\|}}{C}-OOR_2$ (b) $R_3O\underset{\underset{O}{\|}}{C}-OOR_2$ (c) 
$$CH_3-\underset{\underset{\underset{\underset{R_1}{C=O}}{O}}{O}}{\overset{CH_3}{\underset{|}{C}}}-CH_2-CH_2-\underset{\underset{\underset{\underset{R_1}{C=O}}{O}}{O}}{\overset{CH_3}{\underset{|}{C}}}-CH_3$$

(d) $(R_2OO-\underset{\underset{O}{\|}}{C}-CH_2-CH_2-)_2S$ where $R_1$ contains up to 13 carbon atoms and is phenyl, alkyl, alkenyl or carboxylic substituted cycloalkyl;

$R_2$ is t-alkyl of 4–8 carbon atoms; and $R_3$ contains up to 13 carbon atoms and is alkyl, alkenyl or carboxylic substituted cycloalkyl.

3. A composition in accordance with claim 1 wherein said polymerizable component (a) is a syrup comprising a polymer and a monomer.

4. A composition in accordance with claim 1 wherein said polymerizable component (a) comprises a monomer and ethylene glycol dimethacrylate.

5. A composition in accordance with claim 1 wherein said polymerizable component (a) contains a curable coreactant for said acrylics.

6. A composition in accordance with claim 5 wherein said coreactant is a polyester containing co-reactive ethylenic unsaturation.

7. A composition in accordance with claim 1 wherein said polymerizable component (a) has a viscosity of at least about 10 poise and is at least about 10% by weight of solids; said copper and tin promoters (b) provide at least about 1–2 ppm of $Cu^{+2}$ and 100–200 ppm of $Sn^{+2}$; said mercaptan chain transfer agent (c) comprises about $2.5 \times 10^{-5}$ to $5.0 \times 10^{-5}$ mole/gm of the composition; and said peroxyester initiator (d) provides at least about 0.07% by weight of active oxygen in the composition.

8. A composition in accordance with claim 1 wherein said peroxyester is selected from t-butyl peroxy 2-ethyl hexyl carbonate, t-butyl peroxy 2-ethyl hexanoate, t-butyl peroxy neodecanoate, t-butyl peroxy pivalate, 2,5-dimethyl-2,5-bis(2-ethylhexanoyl peroxy)hexane, 2,5-dimethyl-2,5-bis(benzoyl peroxy)hexane, t-butyl peroxy crotonate, bis-(t-butyl peroxy) thiodipropionate, t-amyl peroxy 2-ethylhexanoate and t-butyl peroxytetrahydrophthalic acid.

9. A composition in accordance with claim 1 wherein the peroxyester is t-butyl peroxybenzoate.

10. A composition in accordance with claim 1 wherein said mercaptan chain transfer agent (c) is selected from lauryl-mercaptan, lauryl-3-mercapto propionate and 2-mercapto ethanol.

11. A process for making acrylic polymers comprising: mixing the composition of claim 1 and curing the same under ambient conditions.

12. A process for making acrylic polymers comprising: mixing the composition of claim 2 and curing the same under ambient conditions.

13. A process for making acrylic polymers comprising: mixing the composition of claim 3 and curing the same under ambient conditions.

14. A process for making acrylic polymers comprising: mixing the composition of claim 4 and curing the same under ambient conditions.

15. A process for making acrylic polymers comprising: mixing the composition of claim 5 and curing the same under ambient conditions.

16. A process for making acrylic polymers comprising: mixing the composition of claim 6 and curing the same under ambient conditions.

17. A process for making acrylic polymers comprising: mixing the composition of claim 7 and curing the same under ambient conditions.

18. A process for making acrylic polymers comprising: mixing the composition of claim 8 and curing the same under ambient conditions.

19. A process for making acrylic polymers comprising: mixing the composition of claim 9 and curing the same under ambient conditions.

20. A process for making acrylic polymers comprising: mixing the composition of claim 10 and curing the same under ambient conditions.

* * * * *